US012116240B2

(12) United States Patent
Gangisetti et al.

(10) Patent No.: US 12,116,240 B2
(45) Date of Patent: Oct. 15, 2024

(54) DESTINATION CALLS ACROSS MULTIPLE ELEVATOR GROUPS

(71) Applicant: Otis Elevator Company, Farmington, CT (US)

(72) Inventors: BVSP Ravichand Gangisetti, Andhra Pradesh (IN); Rajinikanth Pusala, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1471 days.

(21) Appl. No.: 16/532,833

(22) Filed: Aug. 6, 2019

(65) Prior Publication Data

US 2020/0048031 A1 Feb. 13, 2020

(30) Foreign Application Priority Data

Aug. 9, 2018 (IN) ............................ 201811029946

(51) Int. Cl.
*B66B 1/24* (2006.01)

(52) U.S. Cl.
CPC ...... *B66B 1/2458* (2013.01); *B66B 2201/103* (2013.01); *B66B 2201/211* (2013.01); *B66B 2201/301* (2013.01); *B66B 2201/4615* (2013.01)

(58) Field of Classification Search
CPC ............ B66B 1/2458; B66B 2201/103; B66B 2201/211; B66B 2201/301;
(Continued)

(56) References Cited

U.S. PATENT DOCUMENTS 4,492,288 A 1/1985 Schroder
4,838,385 A * 6/1989 Ekholm ................ B66B 1/2458
187/247

(Continued)

FOREIGN PATENT DOCUMENTS

CN 1956905 A 5/2007
CN 101121485 A 2/2008

(Continued)

OTHER PUBLICATIONS

European Search Report for application EP 19191096.7, dated Jan. 8, 2020, 31 pages.

(Continued)

*Primary Examiner* — Jeffrey Donels
(74) *Attorney, Agent, or Firm* — CANTOR COLBURN LLP

(57) ABSTRACT

An elevator system includes a first elevator group controller configured to control a first elevator car of a first elevator group; a second elevator group controller configured to control a second elevator car of a second elevator group, the second elevator group controller in bi-directional communication with the first elevator group controller; a destination entry device configured to receive a destination call from a passenger, the destination call identifying a source floor and a destination floor; at least one of the first elevator group controller and the second elevator group controller determining that a journey from the source floor to the destination floor requires a first phase utilizing the first elevator group and a second phase utilizing the second elevator group; at least one of the first elevator group controller and the second elevator group controller allocating the first elevator car and allocating the second elevator car.

14 Claims, 4 Drawing Sheets

(58) Field of Classification Search
CPC .......... B66B 2201/4615; B66B 1/2408; B66B 2201/104; B66B 2201/304; B66B 1/06; B66B 1/3423; B66B 1/3446; B66B 5/0018; B66B 2201/20
See application file for complete search history.

(56) References Cited

U.S. PATENT DOCUMENTS

| | | | | |
|---|---|---|---|---|
| 5,719,360 | A * | 2/1998 | Davis | B66B 1/20 187/383 |
| 5,773,772 | A | 6/1998 | Mccarthy et al. | |
| 5,785,153 | A | 7/1998 | Powell et al. | |
| 5,865,274 | A | 2/1999 | Kiji et al. | |
| 6,394,232 | B1 | 5/2002 | Iwata et al. | |
| 6,644,442 | B1 | 11/2003 | Ylinen et al. | |
| 6,655,501 | B2 | 12/2003 | Kostka | |
| 7,117,980 | B2 | 10/2006 | Wyss et al. | |
| 7,128,190 | B2 | 10/2006 | Kotska et al. | |
| 7,140,472 | B2 | 11/2006 | Tyni et al. | |
| 7,198,136 | B2 | 4/2007 | Urata | |
| 7,258,203 | B2 | 8/2007 | De Jong et al. | |
| 7,487,861 | B2 | 2/2009 | Labarre et al. | |
| 7,841,450 | B2 | 11/2010 | Smith et al. | |
| 8,205,722 | B2 | 6/2012 | Suihkonen et al. | |
| 8,646,581 | B2 | 2/2014 | Iwata et al. | |
| 8,939,263 | B2 | 1/2015 | Tokura | |
| 9,302,885 | B2 | 4/2016 | Christy et al. | |
| 9,580,271 | B2 | 2/2017 | Sorsa et al. | |
| 9,650,225 | B2 | 5/2017 | Salmikuukka et al. | |
| 2004/0262092 | A1 * | 12/2004 | Wyss | B66B 1/18 187/383 |
| 2005/0087402 | A1 * | 4/2005 | Haegi | B66B 1/2458 187/385 |
| 2007/0080027 | A1 * | 4/2007 | De Jong | B66B 1/2458 187/383 |
| 2016/0167920 | A1 * | 6/2016 | Freeman | B66B 1/2458 187/384 |
| 2017/0320702 | A1 | 11/2017 | Gerstenmeyer et al. | |
| 2019/0300327 | A1 * | 10/2019 | Stanley | B66B 1/2458 |
| 2020/0031615 | A1 * | 1/2020 | Hsu | B66B 1/38 |

FOREIGN PATENT DOCUMENTS

| | | | | |
|---|---|---|---|---|
| CN | 102730500 | B | 9/2014 | |
| CN | 104379478 | A | 2/2015 | |
| CN | 106573750 | A | 4/2017 | |
| EP | 1367018 | A2 | 12/2003 | |
| EP | 3381852 | A2 * | 10/2018 | B66B 1/16 |
| EP | 3715296 | A1 * | 9/2020 | B66B 1/06 |
| JP | H07137946 | A | 5/1995 | |
| JP | H08169650 | A | 7/1996 | |
| JP | 2015209301 | A | 11/2015 | |

OTHER PUBLICATIONS

Chinese Office Action for Application No. 201910729110.4; Issued Jul. 5, 2021; 8 pages.

* cited by examiner

DESTINATION CALLS ACROSS MULTIPLE ELEVATOR GROUPS

FOREIGN PRIORITY

This application claims priority to Indian Patent Application No. 201811029946, filed Aug. 9, 2018, and all the benefits accruing therefrom under 35 U.S.C. § 119, the contents of which in its entirety are herein incorporated by reference.

BACKGROUND

The embodiments described herein relate generally to elevator systems, and more particularly, to an elevator system that process destination calls that require travel across a plurality of elevator groups.

Elevators in high rise buildings may be divided into multiple groups for effective traffic management, and to reduce travel time. Not all elevator groups serve from the bottom floor to the top floor of the building. If the elevator group at a source floor does not serve the destination floor, the passenger needs to go to the nearest lobby where the passenger can transfer to another elevator group to reach destination floor. In this process, the passenger needs to give multiple destination calls at elevator lobbies, wait for elevators to come, and if passenger is a visitor to the building, request assistance.

SUMMARY

According to an embodiment, an elevator system includes a first elevator group controller configured to control a first elevator car of a first elevator group; a second elevator group controller configured to control a second elevator car of a second elevator group, the second elevator group controller in bi-directional communication with the first elevator group controller; a destination entry device configured to receive a destination call from a passenger, the destination call identifying a source floor and a destination floor; at least one of the first elevator group controller and the second elevator group controller determining that a journey from the source floor to the destination floor requires a first phase utilizing the first elevator group and a second phase utilizing the second elevator group; at least one of the first elevator group controller and the second elevator group controller allocating the first elevator car for the first phase and allocating the second elevator car for the second phase.

In addition to one or more of the features described herein, or as an alternative, further embodiments may include wherein allocating the first elevator car for the first phase comprises generating a first destination call.

In addition to one or more of the features described herein, or as an alternative, further embodiments may include wherein allocating the second elevator car for the second phase comprises generating a second destination call.

In addition to one or more of the features described herein, or as an alternative, further embodiments may include wherein allocating the first elevator car comprises detecting an operating mode of the first elevator car and allocating a further first elevator car for the first phase when the operating mode of the first elevator car is not normal.

In addition to one or more of the features described herein, or as an alternative, further embodiments may include wherein allocating the first elevator car comprises detecting a load of the first elevator car and terminating the first destination call when the first elevator car load is zero.

In addition to one or more of the features described herein, or as an alternative, further embodiments may include wherein allocating the second elevator car comprises detecting a load of the second elevator car and terminating the second destination call when the second elevator car load is zero.

In addition to one or more of the features described herein, or as an alternative, further embodiments may include wherein the second destination call and the first destination call have the same type.

In addition to one or more of the features described herein, or as an alternative, further embodiments may include wherein allocating the second elevator car comprises determining if a next stop of the first elevator car is an end of the first phase.

In addition to one or more of the features described herein, or as an alternative, further embodiments may include wherein when the next stop of the first elevator car is the end of the first phase, at least one of the first elevator group controller and the second elevator group controller determining a time delay for the passenger to begin the second phase of the journey.

In addition to one or more of the features described herein, or as an alternative, further embodiments may include wherein allocating the second elevator car for the second phase is in response to the time delay.

According to another embodiment, a method of operating an elevator system includes receiving a destination call from a passenger, the destination call identifying a source floor and a destination floor; determining that a journey from the source floor to the destination floor requires a first phase utilizing a first elevator group and a second phase utilizing a second elevator group; allocating a first elevator car for the first phase and allocating a second elevator car for the second phase; wherein allocating the second elevator car comprises determining if a next stop of the first elevator car is an end of the first phase and when the next stop of the first elevator car is the end of the first phase, determining a time delay for the passenger to begin the second phase of the journey.

In addition to one or more of the features described herein, or as an alternative, further embodiments of the method may include wherein allocating the second elevator car for the second phase is in response to the time delay.

In addition to one or more of the features described herein, or as an alternative, further embodiments of the method may include wherein allocating the first elevator car for the first phase comprises generating a first destination call; wherein allocating the second elevator car for the second phase comprises generating a second destination call.

In addition to one or more of the features described herein, or as an alternative, further embodiments of the method may include wherein the second destination call and the first destination call have the same type.

In addition to one or more of the features described herein, or as an alternative, further embodiments of the method may include wherein allocating the first elevator car comprises detecting an operating mode of the first elevator car and allocating a further first elevator car for the first phase when the operating mode of the first elevator car is not normal.

In addition to one or more of the features described herein, or as an alternative, further embodiments of the method may include wherein allocating the first elevator car comprises detecting a load of the first elevator car and terminating the first destination call when the first elevator car load is zero.

In addition to one or more of the features described herein, or as an alternative, further embodiments of the method may include wherein allocating the second elevator car comprises detecting a load of the second elevator car and terminating the second destination call when the second elevator car load is zero.

Technical effects of embodiments of the present disclosure include the ability to allocate elevator cars to a passenger for each phase of a journey based on a single destination call from the passenger.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
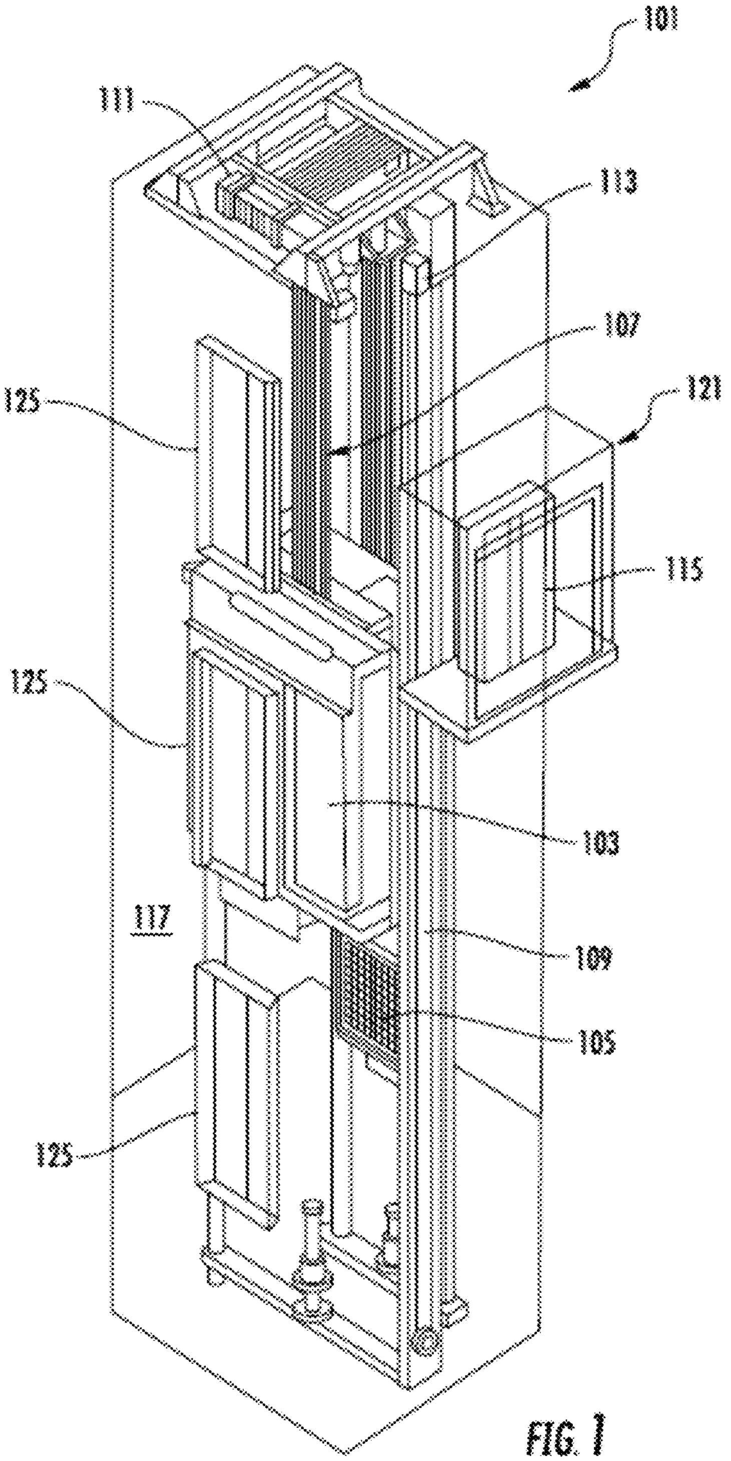
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
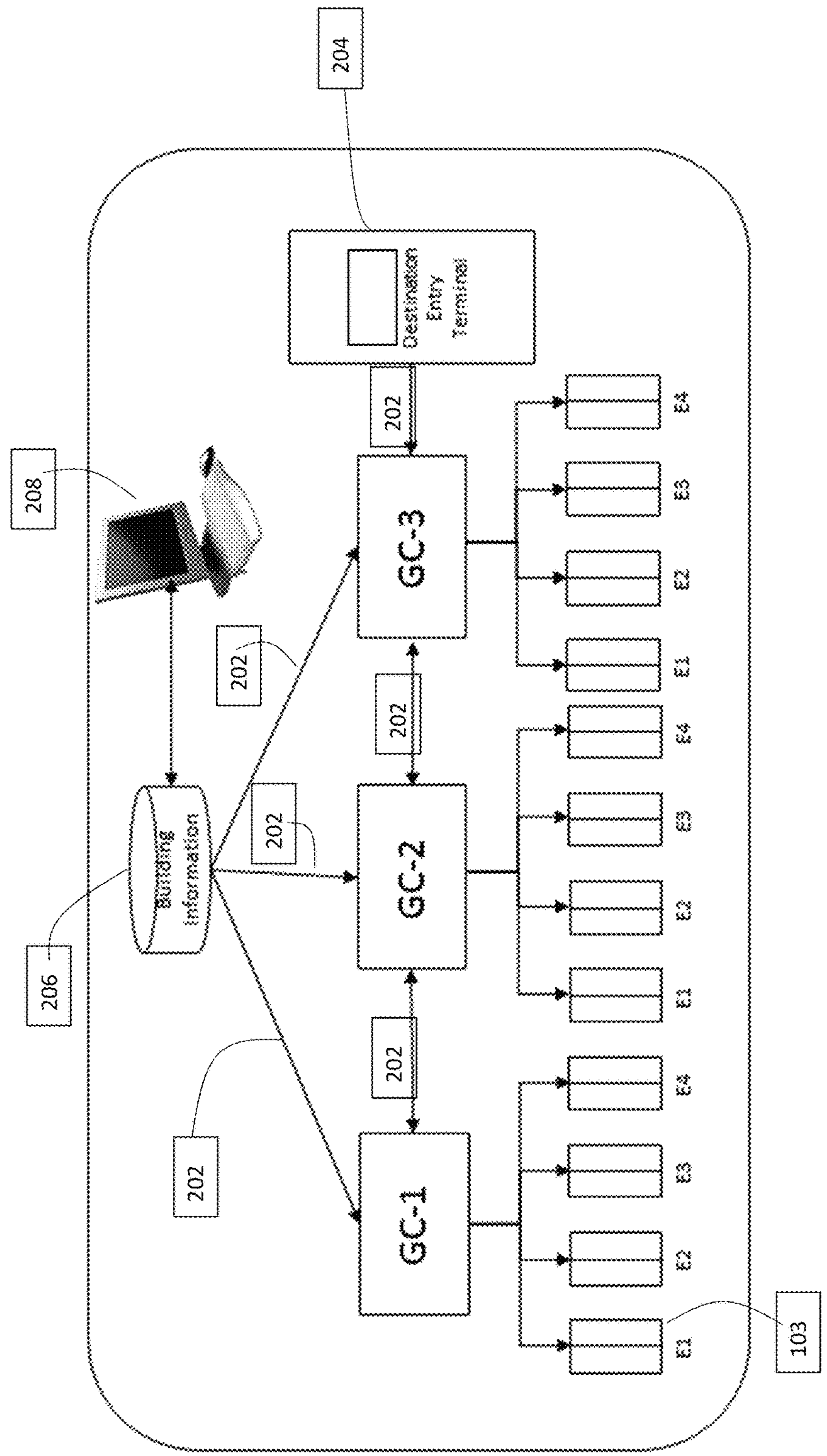
FIG. 2 depicts an elevator system architecture in an example embodiment.

FIG. 2 depicts an elevator system architecture in an example embodiment. The elevator system may include a plurality of elevator cars 103 arranged in groups, where each group of one or more elevators cars 103 is controlled by an elevator group controller. In the example in FIG. 2, there are three elevator group controllers GC-1, GC-2 and GC-3. It is understood that any number of elevator group controllers may be used. Each elevator group controller controls the travel and operation of, for example, four elevator cars, labeled E1-E4, respectively. Each elevator group controller may be implemented using a processor based device (e.g., a server or computer) having conventional computer components, including memory, communication devices, etc. The elevator group controllers GC-1, GC-2 and GC-3 communicate with each other in a bi-directional manner over a network 202 interconnecting the elevator group controllers GC-1, GC-2 and GC-3. Network 202 may be implemented using a wired and/or wireless network components.

A destination entry terminal 204 allows a passenger to enter a destination call. The destination call is then processed by one or more of the elevator group controllers GC-1, GC-2 and GC-3 to determine the journey from the source floor (i.e., where the passenger entered the destination call) to the destination floor. A database of building information 206 stores an association of elevator groups and the floors serviced by each elevator group. The elevator group controllers GC-1, GC-2 and GC-3 access the building information 206 over network 202. The building information 206 may be managed through a terminal 208 (e.g., a personal computer) used to create and edit the association of elevator groups and the floors serviced by each elevator group as needed.

The journey from the source floor to the destination floor may require multiple phases, where each phase includes travel using an elevator car from a different group. The journey may be determined by the elevator group controller assigned to the first phase of the journey. The elevator group controllers may GC-1, GC-2 and GC-3 work in unison to provide the requisite destination calls as the passenger travels from one group to another. For example, if a passenger initially boards an elevator car 103 served by elevator group controller GC-1, then elevator group controller GC-1 may handle generation of all the needed destination calls along the journey. This may include elevator group controller GC-1 sending a request for a destination call to elevator group controller GC-2. Alternatively, the elevator group controller GC-1 may "hand off" responsibility for additional destination calls to elevator group controller GC-2 once the passenger has completed travel on the elevator car 103 controlled by elevator group controller GC-1. It is understood that other control options are available between the elevator group controllers, and embodiments are not limited to the examples described herein.

Figure 3:
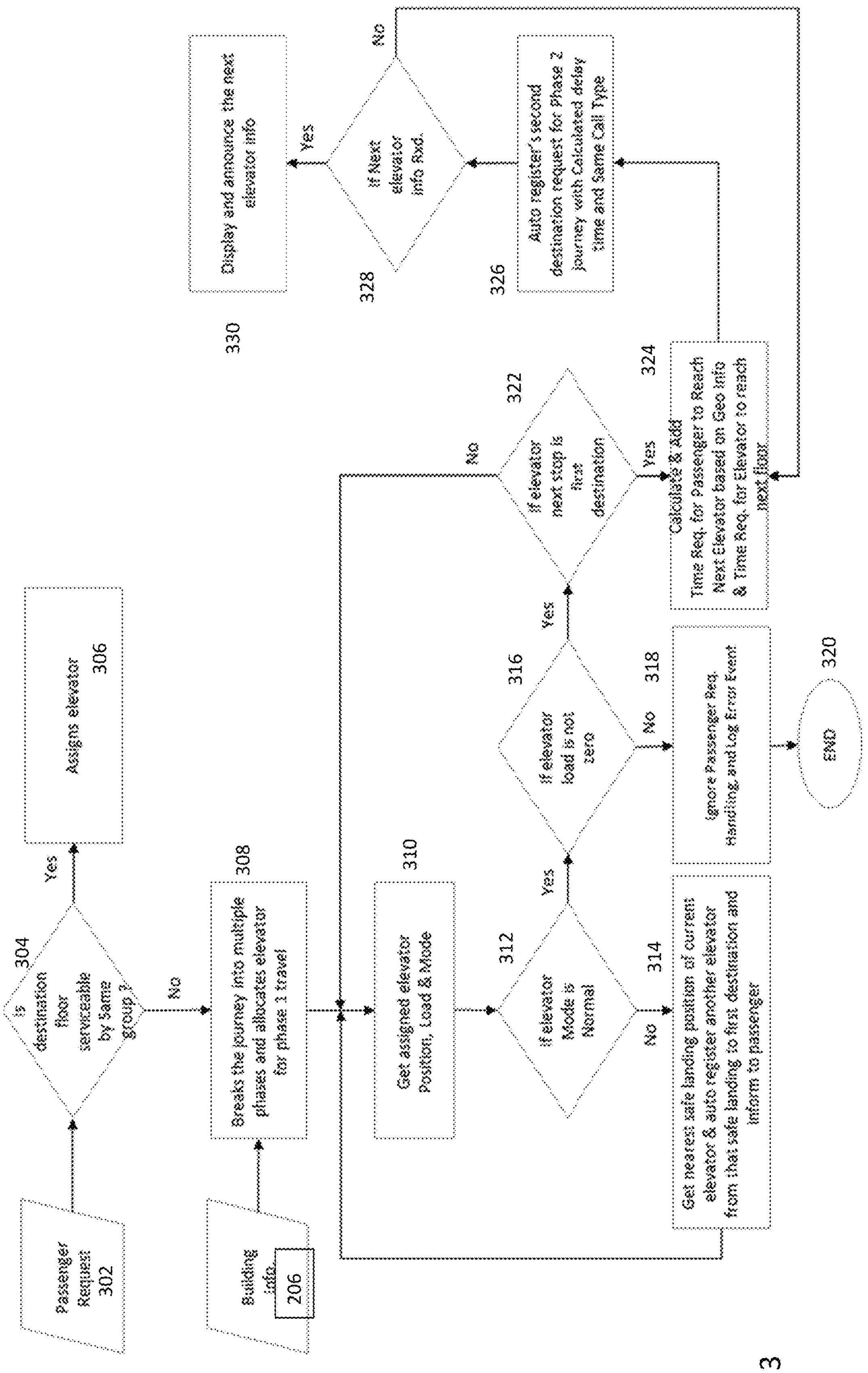
FIG. 3 depicts a process for processing destination calls in an example embodiment.

FIG. 3 depicts a method for processing destination calls in an example embodiment. The method is described as being executed by one or more of the elevator group controllers GC-1, GC-2 and GC-3. As noted above, the elevator group controllers may share processing and assignment of elevator cars as the passenger travels along phases of the journey from the source floor to the destination floor. Each phase of the journey is handled by a different elevator group.

The method begins at 302 where a passenger enters a travel request in the form of a destination call. At 304, one or more of the elevator group controllers determines if the destination floor is serviceable by a single group of elevator cars. If so, flow proceeds to 306 where a single destination call is created for the passenger. The passenger is assigned an elevator car and is directed to the assigned elevator car via a display or other known devices.

If at 304 the destination floor is not serviceable by a single group of elevator cars then flow proceeds to 308 where one or more of the elevator group controllers divides the journey from the source floor to the destination floor into a plurality of phases and allocates an elevator car for the first phase of the journey. This is performed by accessing the building information 206 that identifies which elevator group(s) serve each floor in the building. For example, elevator group controller GC-3 may determine that the first phase of the journey will be served by elevator car E4 of elevator group 3. Elevator group controller GC-3 then creates the destination call that allocates elevator car E4 of elevator group 3 to this passenger.

At 310, one or more of the elevator group controllers obtains the position, load and operating mode of the elevator car assigned to the first phase of the journey at 308. At 312, one or more of the elevator group controllers determines if the operating mode of the assigned elevator car is normal. If the operating mode is not normal, this may indicate a fault in the operation of the elevator car assigned at 308. The process flows to 314 where one or more of the elevator group controllers directs the elevator car assigned at 308 to the nearest safe landing. The one or more of the elevator group controllers also assigns a new elevator car at 314 by assigning a new elevator car for the first phase, and the method loops back to 310.

If the operating mode of the elevator car assigned at 308 is normal, then flow proceeds from 312 to 316, where one or more of the elevator group controllers determines if the load in the assigned elevator car is not zero. If the load in the elevator car is zero, this indicate that the passenger has not boarded the assigned elevator car and the method flows to 318, where the passenger destination call is ignored and an error event is logged. The process then terminates at 320.

If the load in the elevator car is not zero, the method flows to 322 where one or more of the elevator group controllers determines if the next stop of the elevator car is the destination or end of the current phase of the journey. If at 322 the next stop is not the destination of the current phase, the method returns to 310.

If at 322 the next stop is the destination of the current phase, the method flows to 324 where one or more of the elevator group controllers determines the time the passenger will arrive at a landing to commence the second phase of the journey. The time may be calculated based on the geographical location of the elevator car relative to the landing where the second phase of the journey begins and the time for the elevator car to reach the first destination at the end of the first phase. This computation takes into account the time it will take to complete the first phase of the journey and the time it will take for the passenger to walk to the next elevator car landing.

From 324, the method flows to 326 where one or more of the elevator group controllers registers a second destination request corresponding to the second phase of the journey. The second destination request may include a delay time as computed at 324. The second destination request may also include a type of call, where the type of call corresponds to a type of the original destination call. The type of call may specify a type of service, such as standard service, wheelchair service, VIP service, etc. One or more of the elevator group controllers creates a second destination call that allocates a second elevator car of a second elevator group to this passenger. In this manner, each phase of the journey the passenger receives the same type of elevator service, despite using multiple elevator cars.

From 326 the method proceeds to 328 where one or more of the elevator group controllers confirms that the elevator car for the next phase of the journey is confirmed. If not, flow returns to 324 for allocation of an elevator car for the next phase of the journey. If so, flow proceeds to 330 where one or more of the elevator group controllers provides the next elevator car information to the passenger. The information may be provided to the passenger using an in-car display, in-car audio, landing display or landing audio. The passenger may be directed to the next elevator car using a display route map and/or announcements. Each phase of the journey may be handled in the manner as depicted in FIG. 3. In other words, the processing depicted in 310-330 may be performed during a first phase of a journey, second phase of a journey, third phase of a journey, etc., until the journey is completed.

Figure 4:
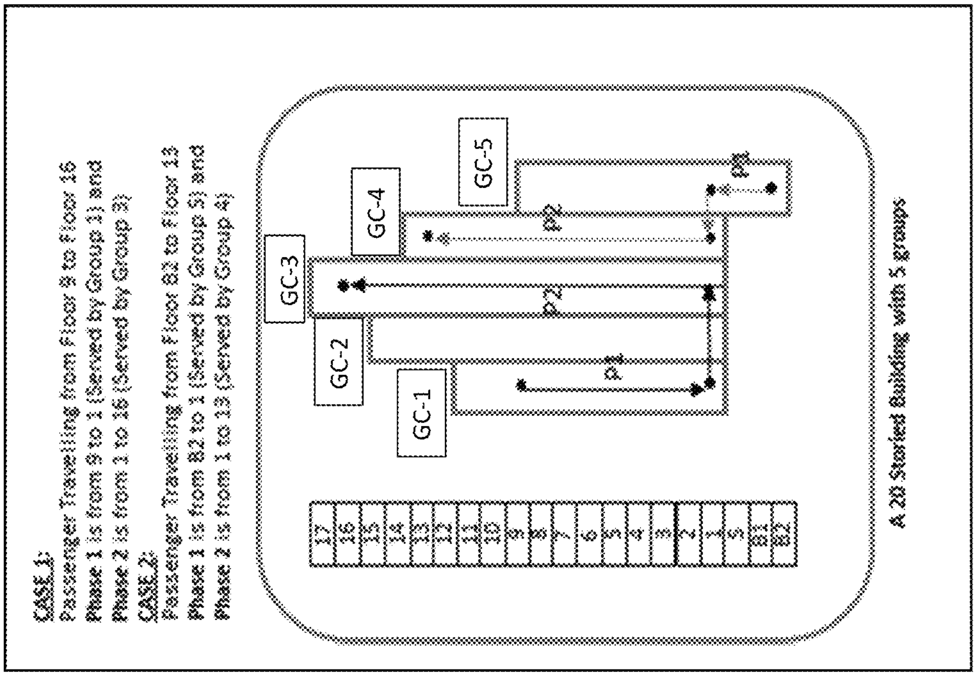
FIG. 4 depicts an example arrangement of elevator groups and example journeys.

FIG. 4 depicts an example arrangement of elevator groups and example journeys by passengers. The elevator system in FIG. 4 employs five elevator group controllers GC-1 through GC-5. Elevator group controller GC-1 controls elevator car(s) servicing floors 1-11. Elevator group controller GC-2 controls elevator car(s) servicing floors 1-15. Elevator group controller GC-3 controls elevator car(s) servicing floors 1-17. Elevator group controller GC-4 controls elevator car(s) servicing floors 1-14. Elevator group controller GC-5 controls elevator car(s) servicing floors B2-9. FIG. 4 illustrates two travel cases. In case 1, the passenger uses an elevator car from group 1 to perform a first phase of travel from floor 9 to floor 1 and an elevator car from group 3 to perform a second phase of travel from floor 1 to floor 16. In case 2, the passenger uses an elevator car from group 5 to perform a first phase of travel from floor B2 to floor 1 and an elevator car from group 4 to perform a second phase of travel from floor 1 to floor 13.

Embodiments provide several advantages such as avoiding the need for a passenger to give multiple destination requests, reducing wait time and travel time and enriching user experience by guiding passengers to different elevator groups using display route map and/or announcements. The type of elevator service is preserved across multiple phases of the journey.

As described above, embodiments can be in the form of processor-implemented processes and devices for practicing those processes, such as a processor in a group controller. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:

a first elevator group controller configured to control a first elevator car of a first elevator group;

a second elevator group controller configured to control a second elevator car of a second elevator group, the second elevator group controller in bi-directional communication with the first elevator group controller;

a destination entry device configured to receive a destination call from a passenger, the destination call identifying a source floor and a destination floor;

at least one of the first elevator group controller and the second elevator group controller determining that a journey from the source floor to the destination floor requires a first phase utilizing the first elevator group and a second phase utilizing the second elevator group;

at least one of the first elevator group controller and the second elevator group controller allocating the first elevator car for the first phase and allocating the second elevator car for the second phase;

wherein allocating the second elevator car for the second phase comprises generating a second destination call;

wherein allocating the second elevator car comprises detecting a load of the second elevator car and terminating the second destination call when the second elevator car load is zero.

2. The elevator system of claim 1 wherein:

allocating the first elevator car for the first phase comprises generating a first destination call.

3. The elevator system of claim 2 wherein:

allocating the first elevator car comprises detecting an operating mode of the first elevator car and allocating a further first elevator car for the first phase when the operating mode of the first elevator car indicates a fault.

4. The elevator system of claim 2 wherein:

allocating the first elevator car comprises detecting a load of the first elevator car and terminating the first destination call when the first elevator car load is zero.

5. The elevator system of claim 1 wherein:

the second destination call and the first destination call have the same type of service.

6. An elevator system comprising:

a first elevator group controller configured to control a first elevator car of a first elevator group;

a second elevator group controller configured to control a second elevator car of a second elevator group, the second elevator group controller in bi-directional communication with the first elevator group controller;

a destination entry device configured to receive a destination call from a passenger, the destination call identifying a source floor and a destination floor;

at least one of the first elevator group controller and the second elevator group controller determining that a journey from the source floor to the destination floor requires a first phase utilizing the first elevator group and a second phase utilizing the second elevator group;

at least one of the first elevator group controller and the second elevator group controller allocating the first elevator car for the first phase and allocating the second elevator car for the second phase;

wherein allocating the second elevator car for the second phase comprises generating a second destination call;

wherein allocating the second elevator car comprises determining if a next stop of the first elevator car is an end of the first phase.

7. The elevator system of claim 6 wherein:

when the next stop of the first elevator car is the end of the first phase, at least one of the first elevator group controller and the second elevator group controller determining a time delay for the passenger to begin the second phase of the journey.

8. The elevator system of claim 7 wherein:

allocating the second elevator car for the second phase is in response to the time delay.

9. A method of operating an elevator system, the method comprising:

receiving a destination call from a passenger, the destination call identifying a source floor and a destination floor;

determining that a journey from the source floor to the destination floor requires a first phase utilizing a first elevator group and a second phase utilizing a second elevator group;

allocating a first elevator car for the first phase and allocating a second elevator car for the second phase;

wherein allocating the second elevator car comprises determining if a next stop of the first elevator car is an end of the first phase and when the next stop of the first elevator car is the end of the first phase, determining a time delay for the passenger to begin the second phase of the journey;

wherein allocating the second elevator car for the second phase comprises generating a second destination call;

wherein allocating the second elevator car comprises detecting a load of the second elevator car and terminating the second destination call when the second elevator car load is zero.

10. The method of claim 9 wherein:

allocating the second elevator car for the second phase is in response to the time delay.

11. The method of claim 9 wherein:

allocating the first elevator car for the first phase comprises generating a first destination call.

12. The method of claim 11 wherein:

the second destination call and the first destination call have the same type of service.

13. The method of claim 9 wherein:

allocating the first elevator car comprises detecting an operating mode of the first elevator car and allocating a further first elevator car for the first phase when the operating mode of the first elevator car indicates a fault.

14. The method of claim 11 wherein:

allocating the first elevator car comprises detecting a load of the first elevator car and terminating the first destination call when the first elevator car load is zero.

* * * * *